United States Patent [19]

Minner et al.

[11] Patent Number: 4,558,675
[45] Date of Patent: Dec. 17, 1985

[54] ELECTRONIC IGNITION SYSTEM FOR GASOLINE INTERNAL COMBUSTION ENGINES

[75] Inventors: Willy Minner, Schwaigern; Heinz-Hermann Spies; Christoph Dömland, both of Wolfsburg, all of Fed. Rep. of Germany

[73] Assignee: Telefunken electronic GmbH, Heilbronn, Fed. Rep. of Germany

[21] Appl. No.: 638,802

[22] Filed: Aug. 8, 1984

[30] Foreign Application Priority Data

Aug. 11, 1983 [DE] Fed. Rep. of Germany ....... 3328951

[51] Int. Cl.[4] .............................................. F02P 7/077
[52] U.S. Cl. ..................................... 123/427; 123/609
[58] Field of Search ................. 123/427, 415, 609, 611

[56] References Cited

U.S. PATENT DOCUMENTS

| 3,799,136 | 3/1974 | Korteling | 123/427 |
|---|---|---|---|
| 3,861,370 | 1/1975 | Howard . | |
| 4,033,272 | 7/1977 | Henrich | 123/427 |
| 4,106,440 | 8/1978 | Lai et al. | 123/427 |
| 4,276,860 | 7/1981 | Capurka | 123/415 |
| 4,301,778 | 11/1981 | Latapie | 123/415 |
| 4,324,216 | 4/1982 | Johnson et al. | 123/415 |
| 4,444,171 | 4/1984 | Baxter | 123/427 |

FOREIGN PATENT DOCUMENTS

| 2509759 | 11/1975 | Fed. Rep. of Germany . |
|---|---|---|
| 2526128 | 1/1976 | Fed. Rep. of Germany . |
| 2636235 | 3/1977 | Fed. Rep. of Germany . |
| 2704269 | 8/1977 | Fed. Rep. of Germany . |
| 2753649 | 6/1978 | Fed. Rep. of Germany . |
| 2757292 | 7/1978 | Fed. Rep. of Germany . |
| 2731746 | 2/1979 | Fed. Rep. of Germany . |
| 3134883 | 4/1983 | Fed. Rep. of Germany . |

Primary Examiner—Andrew M. Dolinar
Attorney, Agent, or Firm—Spencer & Frank

[57] ABSTRACT

The invention relates to an electronic ignition system for gasoline internal combustion engines wherein a Hall sensor is used to generate the reference signal corresponding to the position of the crankshaft or the pistons in the cylinders. The ignition point is electronically controlled in dependence upon the speed and the load. In accordance with the invention, control information in the form of an information voltage is generated at at least one capacitor by the charging and discharging procedure controlled by the reference signal. To determine the ignition point, this information voltage is either compared with a d.c. voltage which is alterable in dependence upon load or it itself is altered in dependence upon load and compared with an unaltered d.c. voltage.

8 Claims, 9 Drawing Figures

ELECTRONIC IGNITION SYSTEM FOR GASOLINE INTERNAL COMBUSTION ENGINES

BACKGROUND OF THE INVENTION

The invention relates to an electronic ignition system for gasoline internal combustion engines with a Hall sensor for generating the reference signal corresponding to the position of the crankshaft or the pistons in the cylinders wherein the ignition point is electronically controlled in dependence upon the speed and the load.

Electronically controlled ignition systems for gasoline internal combustion engines have been advantageously employed in automotive vehicles for some years. These ignition systems control the ignition coil current in such a way that the latter does not reach its maximum until shortly before the ignition point. In the known systems, the ignition coil current is furthermore limited to a defined maximum value. To identify the position of the motor crankshaft either a Hall or an induction sensor is used. These known ignition systems do not control the ignition point electronically in dependence upon the speed and the load, but rather effect this desired control with the aid of mechanical systems. For example, the speed dependency of the ignition point is achieved by the mechanical adjustment of the ignition distributor with the aid of a centrifugal force system, and the load dependency similarly by a mechanically operating vacuum system.

Furthermore, electronic ignition systems wherein the ignition point is electronically controlled in dependence upon speed and load have recently become known. To this end, the engine-related data are transferred to an electronic data store. These data are processed in a microprocessor according to a predetermined program to provide output data which control the ignition procedure. The store and the microprocessors preferably consist of MOS modules. The output stage amplifier and the control of the primary coil current in the ignition coil are, on the other hand, still realized by bipolar technology. The reason for this is that high demands are made on the ignition system with respect to current and voltage stability. The ignition system should, furthermore, operate temperature independently within a large temperature range.

These relatively new ignition systems, often referred to as "characteristic curve ignition" have the advantage that the formerly commonly used mechanical adjustment devices are replaced by electronic components. The disadvantage of characteristic curve ignition is that the electronic modules of the ignition themselves are comparatively expensive and complicated, with the result that characteristic curve ignition has hitherto only been installed in automobiles of the higher price range.

Substantial cost could be saved with an electronic ignition system without mechanical systems, without store and microprocessor, wherein the speed- and load-dependent ignition point is controlled by an analog bipolar system. This is promoted by U.S. Pat. No. 4,324,216. With this ignition system, the information for control of the ignition point is derived from the signal of an induction sensor whose amplitude and curvature are speed-dependent. The disadvantage of this ignition system is that the ignition point in the idle range changes between two states and the speed-dependent ignition point only depends on the curvature of the induction sensor. The ignition point can, therefore, not be influenced in an engine-related manner in the electronic system.

Furthermore, the unavoidable dispersion of the induction sensors fully affects the speed dependency of the ignition point. There is no load-dependent electronic control of the ignition point in this ignition system.

SUMMARY OF THE INVENTION

The object underlying the invention is therefore to indicate an electronic ignition system for gasoline internal combustion engines wherein the ignition point is speed- and load-dependently influenced with low electronic expenditure without a special curvature of a sensor playing a role in this control mechanism. This object is attained in accordance with the invention in an electronic ignition system of this kind mentioned at the outset by the control information being derived from a reference signal controlled charging and discharging procedure of at least one capacitor and by this information voltage either being compared with a d.c. voltage which is alterable in dependence upon load or it itself being altered in dependence upon load and compared with an unaltered d.c. voltage in order to determine the ignition point.

It is furthermore desirable for the ignition coil current to pass for as short a time as possible through the primary coil at the current maximum. To aid in attaining this object, provision is made in accordance with a further development of the invention for the information voltage to be compared with a second d.c. voltage to obtain the point in time at which the current starts to flow through the primary coil, with this second d.c. voltage being altered in dependence upon the duration of the passage of the primary current through the primary coil at its maximum.

The voltage comparisons are preferably carried out with the aid of conventional type comparators. The output signals of the comparators are linked together via logic circuits in such a way that there is obtained for control of the primary coil current an output signal whose one flank determines the ignition point and whose other flank determines the point in time at which the current starts to flow through the primary coil.

The load-dependently alterable d.c. current may, for example, be set with the aid of a potentiometer controlled by the throttle valve. If the d.c. voltage to be compared with the information voltage is constant, a single capacitor is charged with a load-dependently alterable charging current so that the charging current increases as the load increases, which causes a decrease in the advance of the ignition point.

The invention and its further advantageous output circuitry will now be described in further detail with reference to embodiments.

DESCRIPTION OF THE PREFERRED EMBODIMENTS

Figure 3:
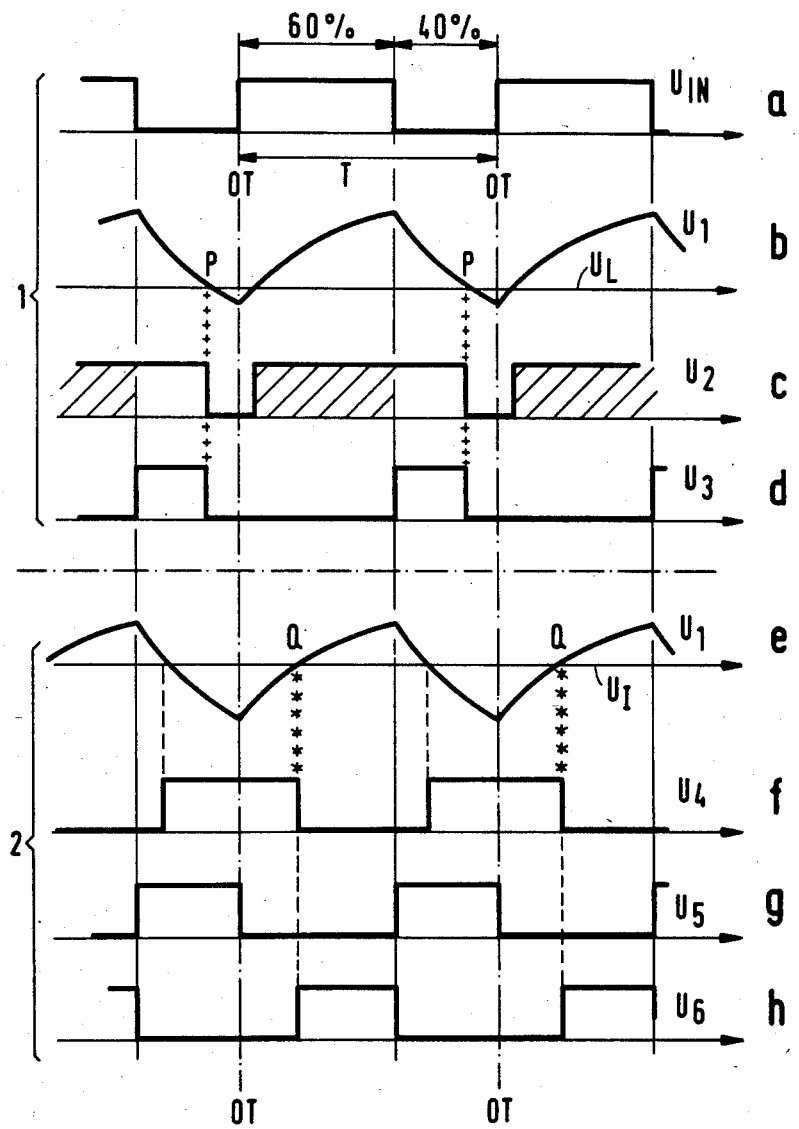
FIG. 3 shows the voltage paths at the various circuit points of FIG. 1.

In accordance with the invention, a Hall sensor whose curvature is a meander as shown in FIG. 3a is used to indicate the position of the crankshaft or the pistons in the engine cylinders. This curvature is independent of the speed and has a low and a high phase per period, with the percentage duration of the respective state in relation to the period duration T being defined, for example, by a rotating cover fixedly coupled with the crankshaft. This input signal $U_{IN}$ in accordance with FIG. 3a is located at the input of an electronic circuit in accordance with FIG. 1. This circuit is preferably realized in bipolar technology.

The rotating cover of the Hall sensor is, for example, coupled with the crankshaft in such a way that the positive flank of the Hall signal, i.e., the jump from the low state to the high state occurs when one of the pistons in the engine cylinder is located at the upper dead center O.T. or, depending on the engine design, in the proximity of the upper dead center. The cover may, for example, be of such design that after 60% of the period T, the signal $U_{IN}$ goes over from the high state to the low state and remains there for the remaining 40% of the period duration.

Figure 1:
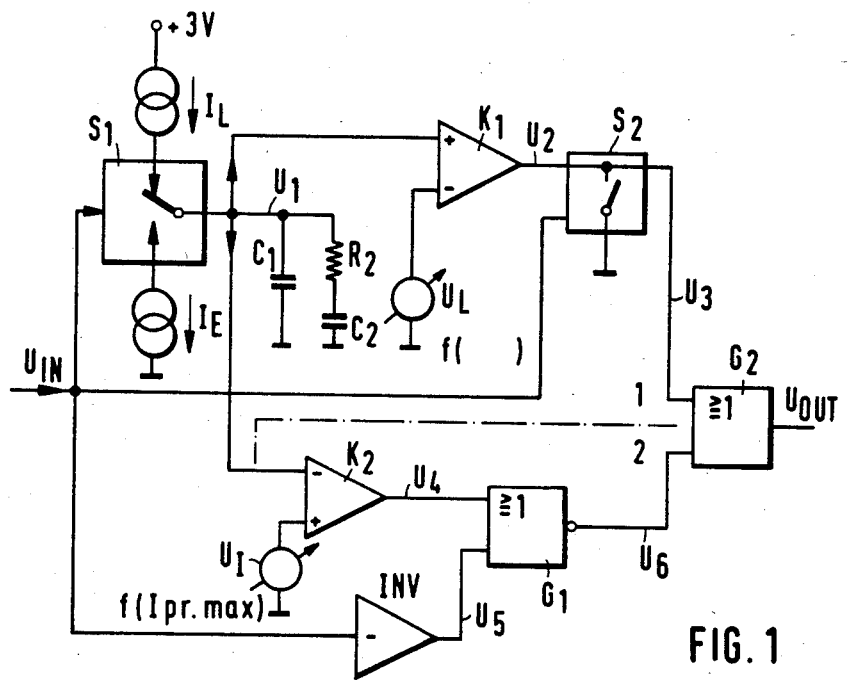
FIG. 1 shows the block diagram of the electronic ignition system according to the invention.

In accordance with the circuit in FIG. 1, this input signal $U_{IN}$ controls a switch $S_1$ in such a manner that via this switch in the high phase of the reference signal $U_{IN}$ a charging current $I_L$ charges a capacitor unit to the voltage $U_1$. In the low phases of the reference signal $U_{IN}$, on the other hand, the capacitor unit discharges itself with the constant current $I_E$. The capacitor unit consists, for example, of two parallel connected current branches, with the capacitance $C_1$ connected in one current branch, and the capacitance $C_2$ and the resistance $R_2$ connected in series in the other current branch. The path of the voltage $U_1$ at the capacitor unit is shown in FIG. 3b and in FIG. 4b.

Figure 6:
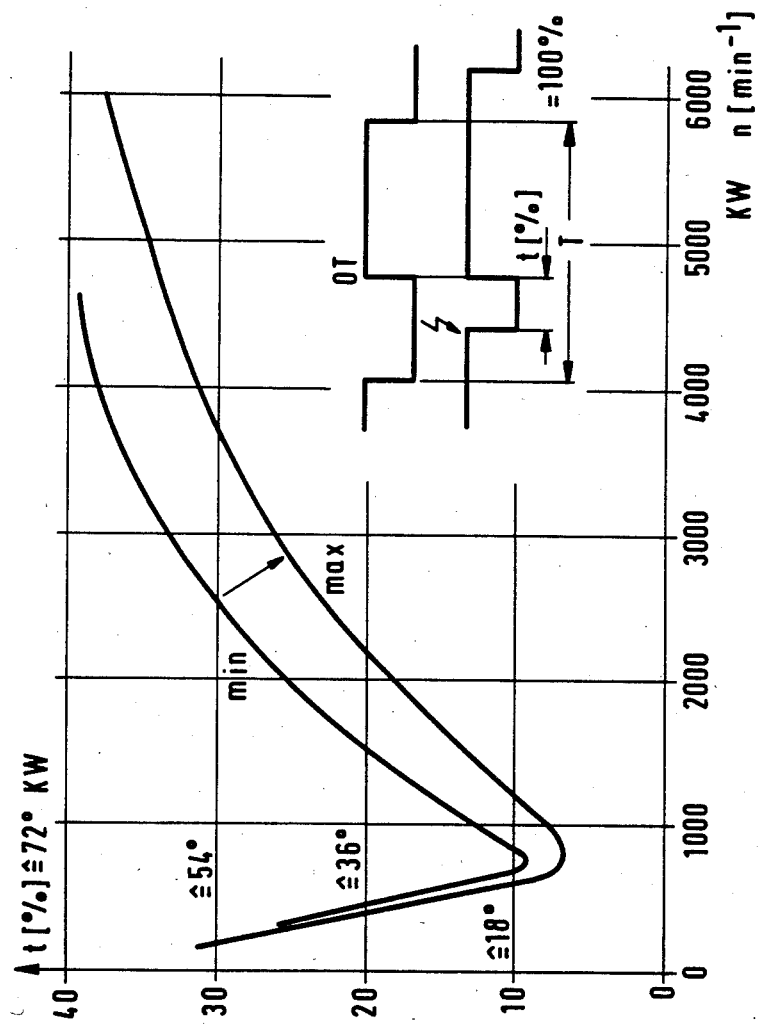
FIG. 6 shows the advance of the ignition point before the upper dead center in dependence upon the speed and the load in a circuit according to FIGS. 1 and 2.

The path of the information voltage $U_1$ can be influenced in an engine-related manner by the design and dimensions of the capacitor unit in such a way that in accordance with FIG. 6, the advance of the ignition point before the upper dead center does not rise linearly with the speed, but, as desired in certain cases, the advance from idle at approximately 750 r.p.m./min. first rises steeply and then flatter.

Figure 2:
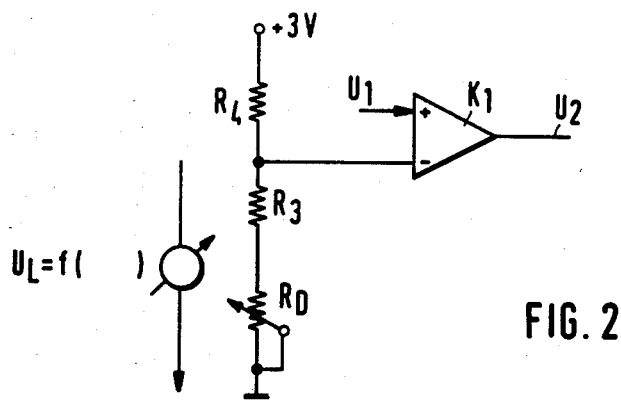
FIG. 2 shows the circuit for the setting of the load-dependent voltage.

The information voltage $U_1$ at the capacitor unit is fed in accordance with FIG. 1 to the non-inverting input of a comparator $K_1$. The d.c. voltage $U_L$ is located at the inverting input of this comparator $K_1$. In accordance with FIG. 2, this d.c. voltage is set with the aid of a load-dependently alterable resistance $R_D$. The resistance $R_D$ is altered, for example, by the throttle valve. The resistance $R_D$ increases as the load decreases, which results in an increase in the advance of the ignition point as the load decreases. In FIG. 2, resistance $R_D$ is part of a series connection comprising the resistances $R_4$, $R_3$ and $R_D$, with the inverting input of the comparator $K_1$ being connected to the connection between the resistances $R_3$ and $R_4$. In one embodiment, the resistances have, for example, the following values:

$R_4 = 9 k\Omega$ $R_3 = 1 k\Omega$ $R_D = 800 \Omega$ (in idle)

$R_D = 0 \Omega$ (at maximum load).

Figure 4:
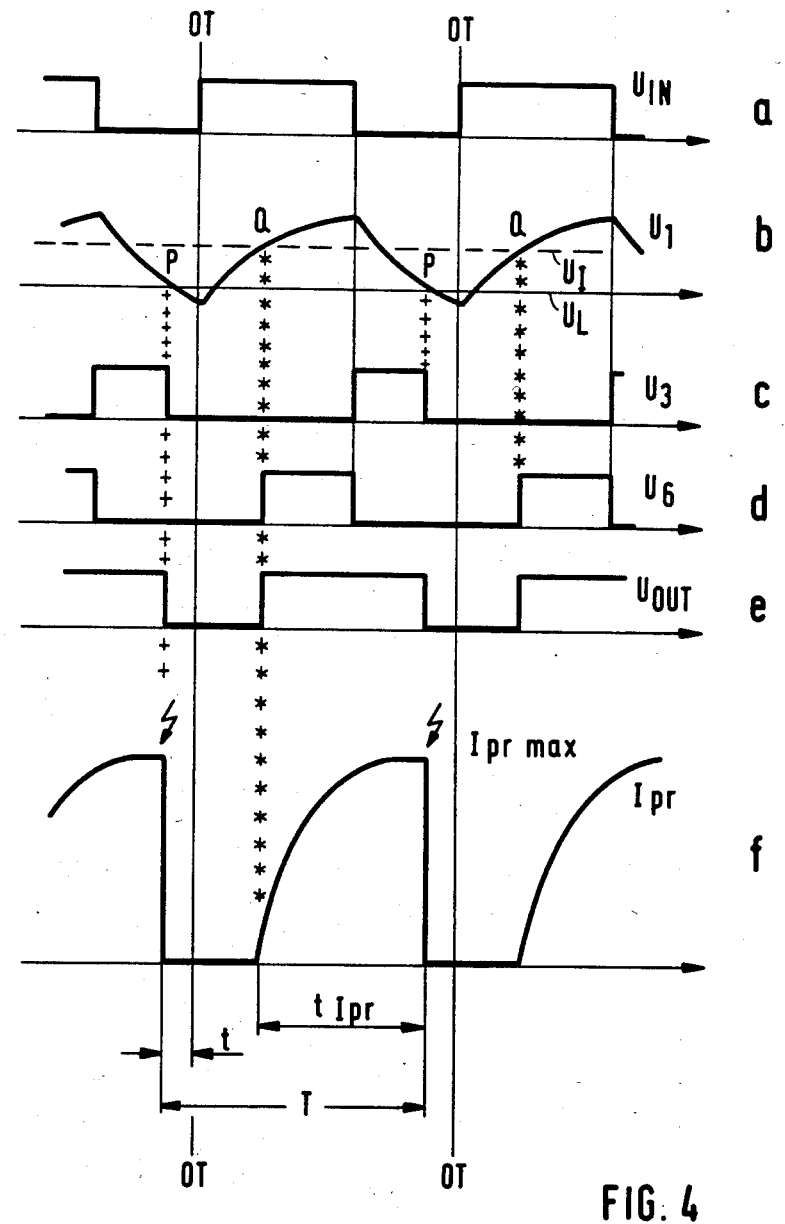
FIG. 4 shows, in addition, the output signal of the circuit according to FIG. 1 and the path of the primary current in the ignition coil.

In FIGS. 3b and 4b, the d.c. voltage $U_L$ is depicted by a line. Its point of intersection P with the decreasing flank of the information voltage $U_1$ determines the ignition point. As is apparent from FIGS. 3b and 4b, the advance t (FIG. 4f) of the ignition point with respect to the upper dead center O.T. increases as the voltage $U_L$ increases and the load simultaneously decreases.

In accordance with FIG. 3c, the voltage $U_2$ appears at the output of the comparator $K_1$. This voltage is meander-shaped and has the low state when the information voltage $U_1$ is smaller than the d.c. voltage $U_L$, and it has the high state when the information voltage $U_1$ is larger than the aforementioned d.c. voltage $U_L$.

Connected downstream of the output of comparator $K_1$ is the reference signal $U_{IN}$ controlled switch $S_2$ which in the high state of the reference signal $U_{IN}$ is closed and in the low state of the reference signal $U_{IN}$ is open. In this way, the hatched area of the high phase of the signal $U_2$ in FIG. 3c is faded out. There therefore appears at the output of the switch unit $S_2$ the signal $U_3$ shown in FIG. 3d and FIG. 4c which has the high state from the negative flank of the reference signal $U_{IN}$ to the ignition point. This signal $U_3$ is directed to one input of an OR gate $G_2$.

As already mentioned, the control signal for the primary current in the ignition coil should be of such configuration that this current remains for as short a time as possible at its maximum. To this end, the information voltage $U_1$ is fed to the inverting input of a further comparator $K_2$, in accordance with FIG. 1, at whose non-inverting input the voltage $U_I$ is located. The d.c. voltage $U_I$ is illustrated in FIGS. 3e and 4b by a line. Its point of intersection Q with the rising flank of the information voltage $U_1$ determines the point in time at which the current $I_{pr}$ starts to flow through the primary coil. If the primary current $I_{pr}$ stays at its maximum $I_{prmax}$ (FIG. 4f) too long, the voltage $U_I$ increases and the starting point for the primary coil current is delayed. The way in which the duration of the primary coil current at its maximum can be determined is apparent, for example, from German Pat. No. 3,015,939.

The output signal $U_4$ at the comparator $K_2$ is illustrated in FIG. 3f. The meander-shaped signal $U_4$ has the high state when the information voltage $U_1$ is smaller than the voltage $U_I$ and has the low state when the information voltage $U_1$ is larger than $U_I$. This voltage $U_4$ is fed to the input of a NOR gate $G_1$, at whose other input the inverted reference signal $U_5$ in accordance with FIG. 3g is located. A conventional inverter Inv. is used to invert the reference signal $U_{IN}$. At the output of the NOR gate $G_1$ there then occurs the signal $U_6$ in accordance with FIG. 3h and FIG. 4d which between the point of intersection Q and the negative flank of the reference signal $U_{IN}$ has the high state and during the remainder of the period duration T has the low state.

The voltages U3 and U6 in accordance with FIGS. 3d and 3h and 4c and 4d, respectively, are fed to an OR gate $G_2$ whose output signal $U_{out}$ is illustrated in FIG. 4e. The low phase of this output signal $U_{out}$ is defined by the points of intersection P and Q, respectively, in accordance with FIG. 4b. Consequently, the output signal $U_{out}$ is in the low state between the points of intersection P and Q and in the high state during the remaining time.

In accordance with FIG. 4f, the rising flank of the output signal $U_{out}$ switches on the primary coil current which shortly before the ignition point remains at its maximum for a short time and is abruptly switched off with the decreasing flank of the output signal $U_{out}$ so that ignition occurs. The limitation of the ignition coil current at its maximum is effected, for example, with the aid of a circuit, as similarly described in German Pat. No. 3,015,939. This known circuit also supplies a control pulse whose pulse width $t_e$ corresponds to the duration of the primary coil current at maximum. With this control pulse the d.c. voltage $U_I$ at the comparator $K_2$ can be set such that this duration of the coil current at maximum becomes as short as possible.

Figure 5:
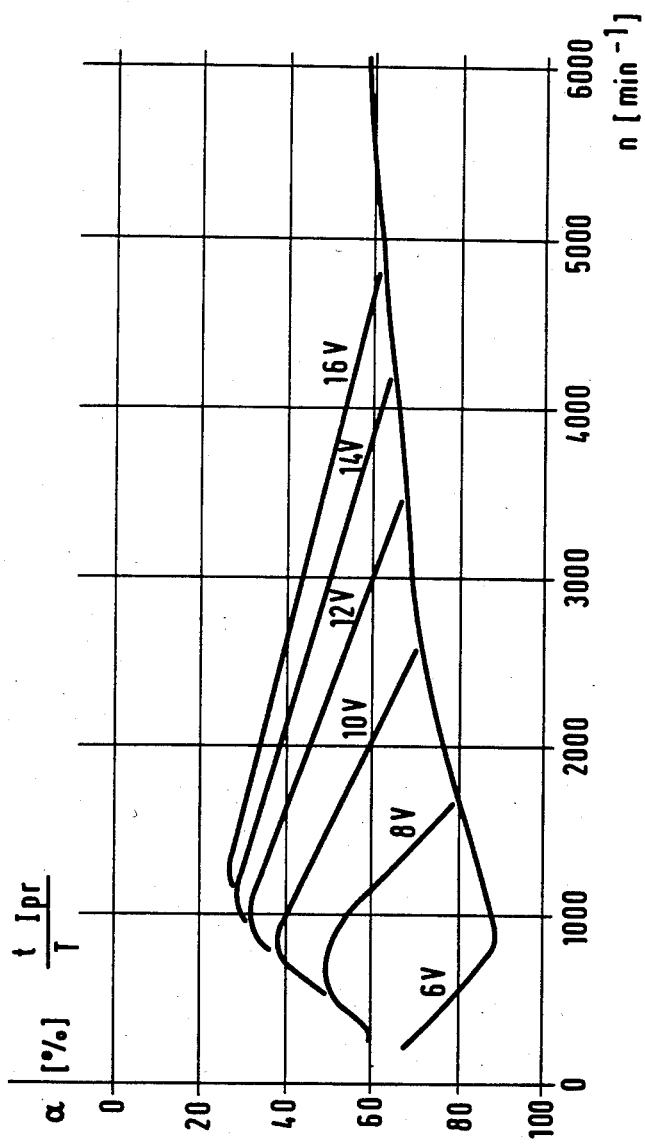
FIG. 5 shows the closing angle in dependence upon the speed and the battery voltage under the conditions at maximum load.

In FIG. 5, the closing angle is depicted at maximum load in dependence upon the speed and the battery voltage. By closing angle the relationship between the time in which primary current flows in the ignition coil and the total period duration T is meant. The battery voltage is the voltage which is respectively available when the circuit is in operation, as illustrated, for example, in FIG. 2 of German Pat. No. 3,015,939. FIG. 5 shows the measured closing angle for a 4-cylinder engine with a circuit constructed in accordance with the invention as function of the battery voltage of 6 V to 16 V. Here, a transistor ignition coil with its primary coil current set at 7.5 A was used.

FIG. 6 shows the percentage advance of the ignition point before the upper dead center O.T. in relation to the period duration in dependence upon the motor speed and as function of the load as parameter. The percentage advance was also converted at the ordinate into degrees crankshaft (°CS) for a four-cylinder engine. The advance is independent of voltage from 5 V battery voltage upwards.

As is apparent from the diagram, the advance decreases as the load increases and increases from approximately idle speed with the speed.

Figure 7:
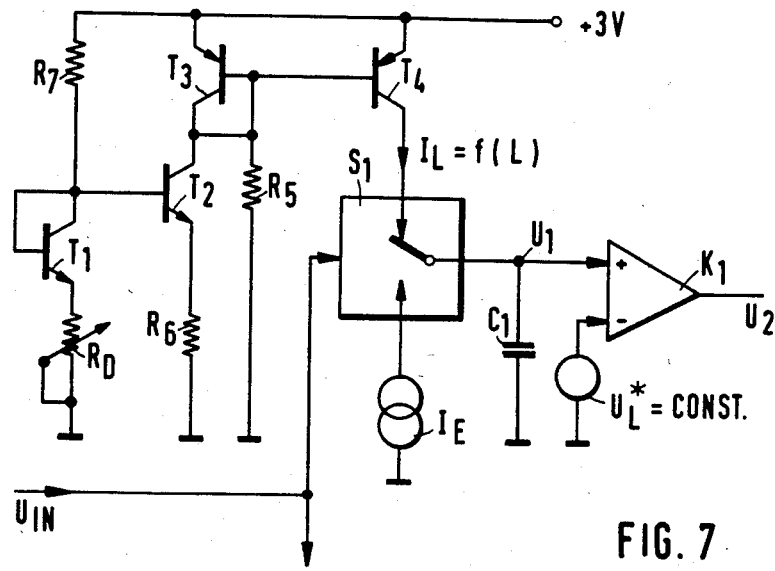
FIG. 7 shows a circuit for the load-dependent alteration of the saw-toothed voltage path at a capacitor.
Figure 9:
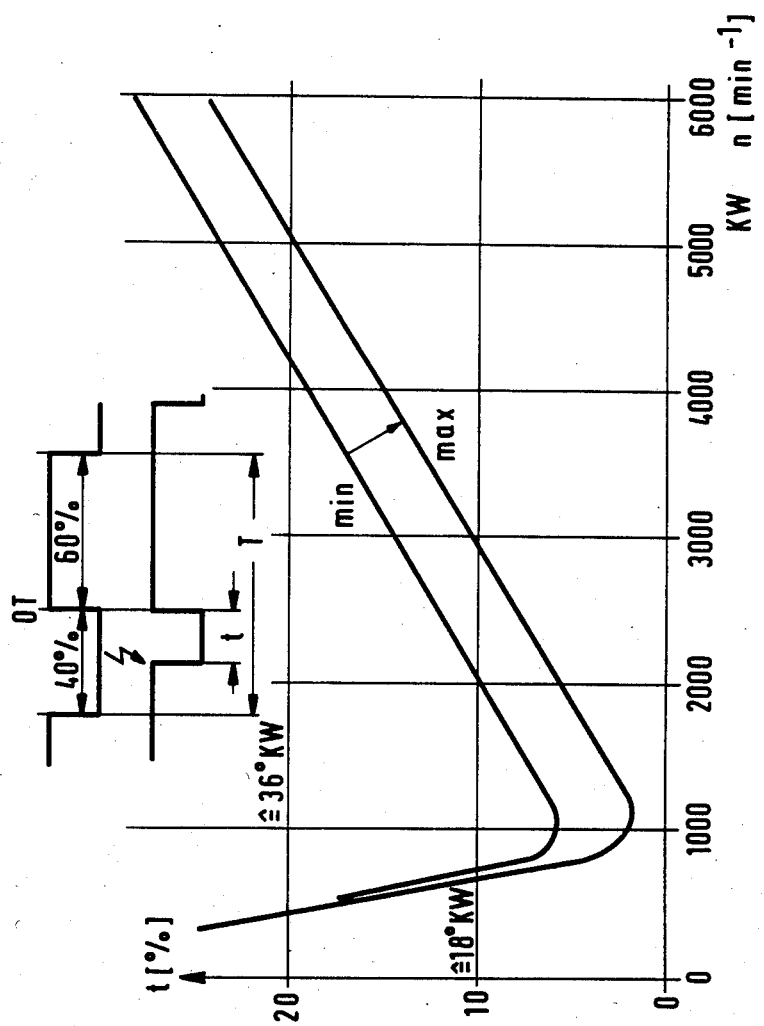
FIG. 9 shows, in turn, the path of the advance of the ignition point before the upper dead center in dependence upon the speed and the load in a circuit according to FIG. 7.

In many cases, it is also desirable for the curve branches in accordance with FIG. 6 to extend parallel to one another as the speed increases for different load parameters. Such a path is depicted in FIG. 9. This path is acquired by using instead of the capacitor unit in FIG. 1 only one single capacitance $C_1$ in accordance with FIG. 7. Here, the charging current $I_L$ of this capacitance $C_1$ is load-dependently altered in such a way that as the load increases the charging current increases and thus the advance of the ignition point before the dead center O.T. decreases. To this end, the circuit in accordance with FIG. 7 consists of a current source with the transistors $T_1$ and $T_2$, and the current of this current source is set with the variable resistance $R_D$. This resistance is, for example, controlled by the throttle valve again and has in idle a value of, for example, 0Ω and at maximum load a value of approximately 5kΩ. The resistance $R_D$ is inserted into the emitter section of the transistor $T_1$ connected as diode. In the collector branch of the transistor $T_1$ lies a resistance $R_7$ comprising, for example, 7kΩ. The diode $T_1$ and the resistance $R_D$ are arranged parallel to the resistance $R_6$ and to the base-emitter section of a transistor $T_2$. The resistance $R_6$ has, for example, a value of 125kΩ. A transistor $T_3$ which is part of a current mirror circuit comprising the transistors $T_3$ and $T_4$ is located in the collector branch of the transistor $T_2$. The transistor $T_3$ is connected as diode and its base is coupled with the base of a transistor $T_4$ at whose collector there appears the variable output current $I_L$ with which the capacitance $C_1$ is charged. The emitters of the two transistors $T_3$ and $T_4$ are coupled with each other and connected to a supply potential. The base of the two transistors $T_3$ and $T_4$ is connected via a resistance $R_5$ to ground; this resistance has, for example, a value of 96kΩ. The variable information voltage $U_1$ and the capacitance $C_1$ is fed to the non-inverting input of the comparator $K_1$ at whose inverting input an invariable d.c. voltage $U_{L*}$ is applied. The charging current for the capacitance $C_1$ is, for example, at minimum load 25 μA and at maximum load 33 μA. The discharge current $I_E$ of the capacitance $C_1$ is constant.

Figure 8:
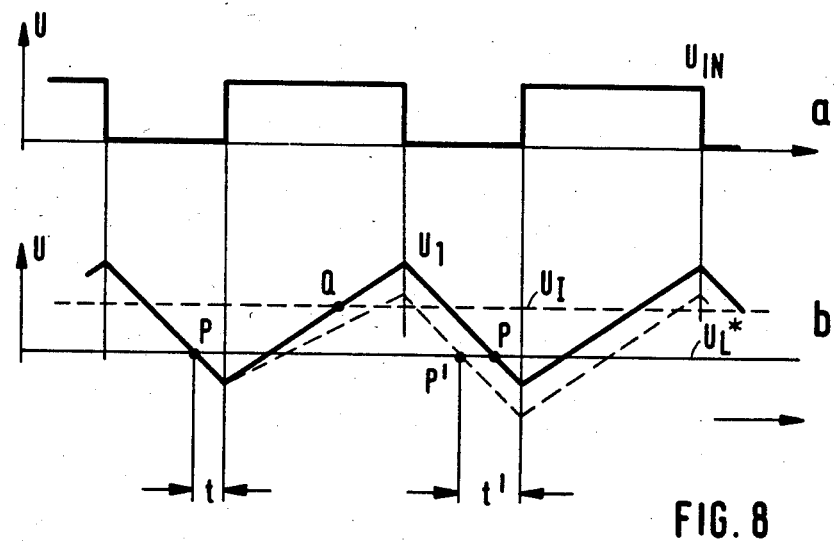
FIG. 8 shows this voltage path.

From FIG. 8 it is apparent how the ignition point changes with the load. FIG. 8a, in turn, shows the reference signal $U_{IN}$ in accordance with FIG. 3a. The saw-toothed path of the information voltage $U_1$ when the capacitor unit consists of only one single capacitance $C_1$ is evident from FIG. 8b. The points P and Q are, in turn, the points of intersection with the invariable d.c. voltage $U_{L*}$ and the d.c. voltage $U_I$ dependent on the duration at maximum primary current, respectively. The advance t changes to the value t' when the load is reduced. In this case, the resistance $R_D$ becomes smaller so that the charging current for the capacitance $C_1$ decreases. The voltage path at the capacitance $C_1$ then takes the course shown in dashed lines in FIG. 8. In the high phases of the reference signal the voltage at the capacitance $C_1$ is charged to a relatively low value and then discharges itself with the unchanged discharge current $I_E$ so that the point of intersection P with the constant d.c. voltage $U_{L*}$ already occurs at an earlier point in time, resulting in the increase in the advance of the ignition point with the time t'.

What is claimed is:

1. An electronic ignition system for a gasoline internal combustion engine having a plurality of cylinders each containing a piston and an ignition element, a crankshaft connected to the pistons to be rotated by movement of the pistons in their respective cylinders, and a primary coil connected to supply ignition current to each ignition element, said system comprising a Hall sensor connected for generating a reference signal corresponding to the position of one of the crankshaft and pistons, and means for deriving control information for electronically controlling the moment of supply of ignition current to each ignition element in dependence upon the speed of and the load on the engine, said means comprising: a capacitor unit connected to be alternately charged and discharged under control of the reference signal for producing a first electrical signal constituting an information signal; means for supplying a second electrical signal constituted by a first d.c. voltage; voltage altering means connected for altering the voltage value of one of the first and second signals in dependence upon engine load; first comparator means connected for comparing that one of said first and second signals which is altered by said voltage altering means with the other one of said first and second signals for producing a signal for controlling the moment of supply of ignition current to each ignition element; means for supplying a third electrical signal constituted by a second d.c. voltage; means, connected to said means for supplying a third electrical signal, for altering the value of the third signal in dependence upon the duration of the current flowing through the primary coil when that current has its maximum value; and second comparator means connected for comparing the first signal with the altered third signal in order to determine the moment at which current begins to flow through the primary coil.

2. Electronic ignition system according to claim 1, wherein to generate the first signal ($U_1$), said a capacitor unit is charged in the high phase of the reference signal ($U_{IN}$) and discharged with a constant current ($I_E$) in the low phase of the reference signal.

3. Electronic ignition system according to claim 2 wherein said capacitor unit consists of two parallel connected current branches, with the one current branch containing a capacitance ($C_1$) and the other current branch a further capacitance ($C_2$) and a resistance ($R_2$), wherein the charging current for said capacitor unit is constant, and said voltage altering means alter the voltage value of the second signal.

4. Electronic ignition system as defined in claim 1 wherein said capacitor unit comprises first and second parallel connected branches, said first branch containing a first capacitor and said second branch containing a series connection of a second capacitor and a first resistor, and the first signal produced by said capacitor unit varies in a manner to cause the advance of the moment of supply of ignition current to vary non-linearly with engine speed.

5. Electronic ignition system as defined in claim 1 further comprising logic circuit means connected for linking the outputs of said first and second comparator means in order to produce an output signal for controlling the current through the primary coil, the output signal having a waveform which includes a first flank that determines the beginning of flow of current through the primary coil and a second flank which determines the moment of supplying of ignition current to a respective ignition element.

6. Electronic ignition system as defined in claim 1 wherein the engine has a throttle valve and said voltage altering means comprise a variable resistor connected to have its resistance varied by movement of the throttle valve.

7. Electronic ignition system as defined in claim 1 wherein: said capacitor unit consists of a single capacitor; said voltage altering means comprise means for charging said single capacitor with a charging current which varies in dependence upon engine load and means for discharging said single capacitor with a constant current; and said first d.c. voltage has a constant value.

8. Electronic ignition system as defined in claim 7 wherein said means for charging said single capacitor comprise a source of a current which varies in dependence on engine load, and a current mirror circuit connected for supplying said single capacitor with a charging current proportional to the current produced by said source.

* * * * *